United States Patent [19]
Kurtz

[11] 3,830,614
[45] Aug. 20, 1974

[54] INJECTION MOLDING MACHINE

[76] Inventor: Albert Kurtz, Box 147, Inverness, Calif. 94937

[22] Filed: Dec. 1, 1972

[21] Appl. No.: 311,273

[52] U.S. Cl............................. 425/242, 425/451.6
[51] Int. Cl.............................................. B29f 1/06
[58] Field of Search .......... 425/242, 243, 249, 450, 425/451

[56] References Cited
UNITED STATES PATENTS

| | | | |
|---|---|---|---|
| 2,629,132 | 2/1953 | Willcox et al. | 425/242 |
| 3,292,214 | 12/1966 | Battenfeld et al. | 425/450 |
| 3,310,842 | 3/1967 | Fischbach | 425/450 |
| 3,761,215 | 9/1973 | Tardato | 425/406 |

*Primary Examiner*—Milton S. Mehr
*Attorney, Agent, or Firm*—Phillips, Moore, Weissenberger, Lempio & Strabala

[57] ABSTRACT

An injection molding machine comprises a stationary support having first and second mold parts reciprocally mounted thereon to define a split mold cavity therebetween. The upper end of an actuating lever is pivotally attached to the second mold part whereas the lower end thereof is pivotally attached to a spring-biased slide block. A continuously rotating crank is attached to the lever to reciprocate the second mold part relative to the first mold part during a molding cycle. The spring-biased slide block is pre-adjusted to apply a substantially uniform molding pressure to the mold parts and attendant structures upon rotation of the crank.

20 Claims, 5 Drawing Figures

INJECTION MOLDING MACHINE

BACKGROUND OF THE INVENTION

Conventional injection molding machines normally employ electrically controlled and hydraulically actuated pumps, valves and cylinders for injecting a liquified, plastic material into a mold cavity. Such systems require considerable horsepower and are unduly complicated and prone to breakdown. In addition, substantially uniform molding pressures, required to precisely form the molded articles, are not always achieved continuously.

Molding machines employing mechanical linkages, such as cranks, gear boxes and associated clutches, are also subject to erratic performances. Such systems are unreliable in that they do not continuously assure a uniform molding cycle, resulting in high molding and maintenance costs. Also, a uniform flow rate upon injection of the liquified plastic into the mold cavity is not continuously assured which oftentimes results in defective articles.

SUMMARY AND OBJECTS OF THIS INVENTION

An object of this invention is to overcome the above, briefly described problems by providing an economical and efficient injection molding machine adapted to continuously perform molding cycles in a consistent and uniform manner.

The molding machine comprises first and second separable mold parts defining a split mold cavity therebetween. During a molding cycle, the second mold part is moved into engagement with the first mold part under the influence of spring means for applying a substantially uniform pressure to the first mold part.

DETAILED DESCRIPTION

Figure 1:
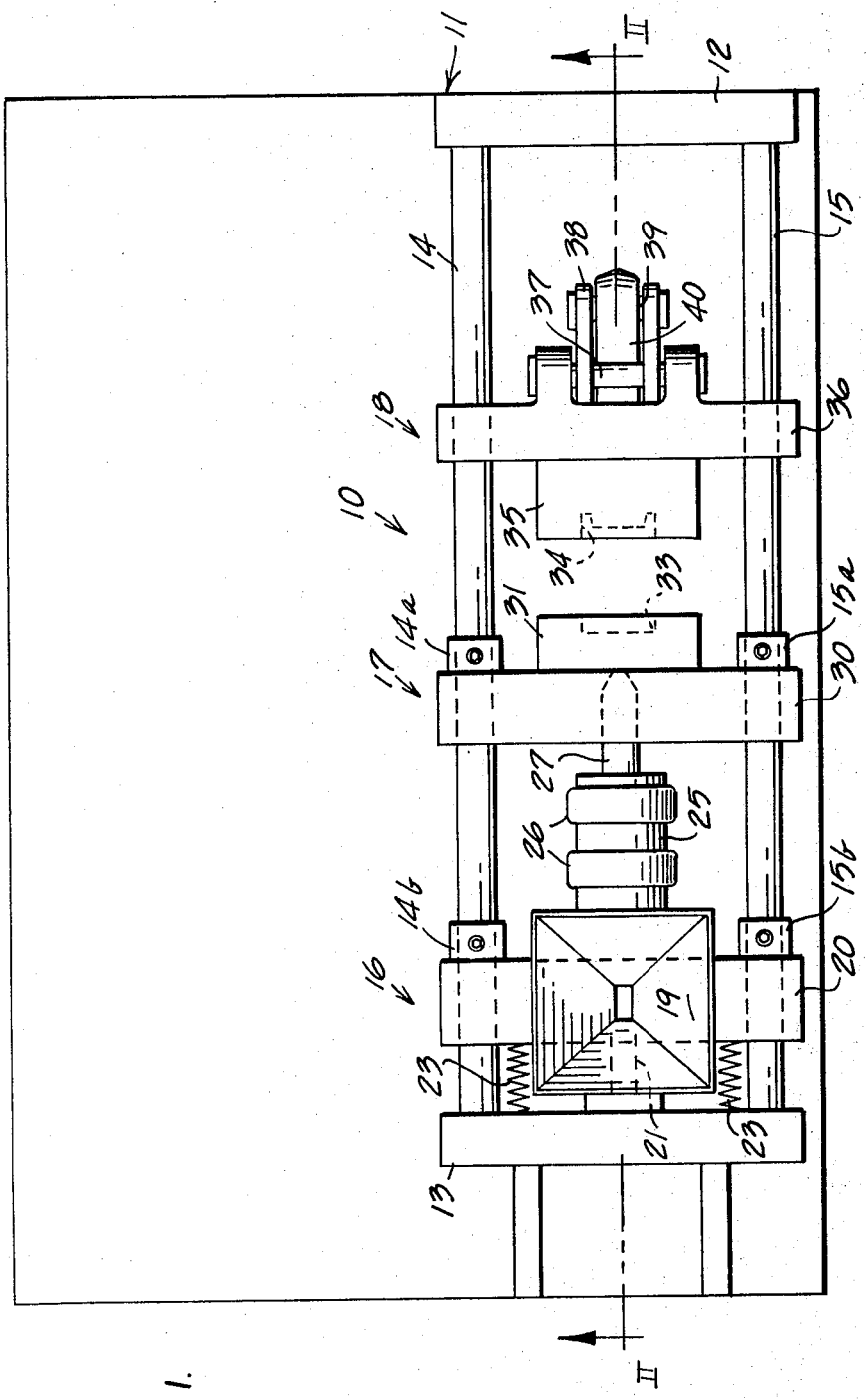
FIG. 1 is a top plan view of the injection molding machine of this invention.
Figure 2:
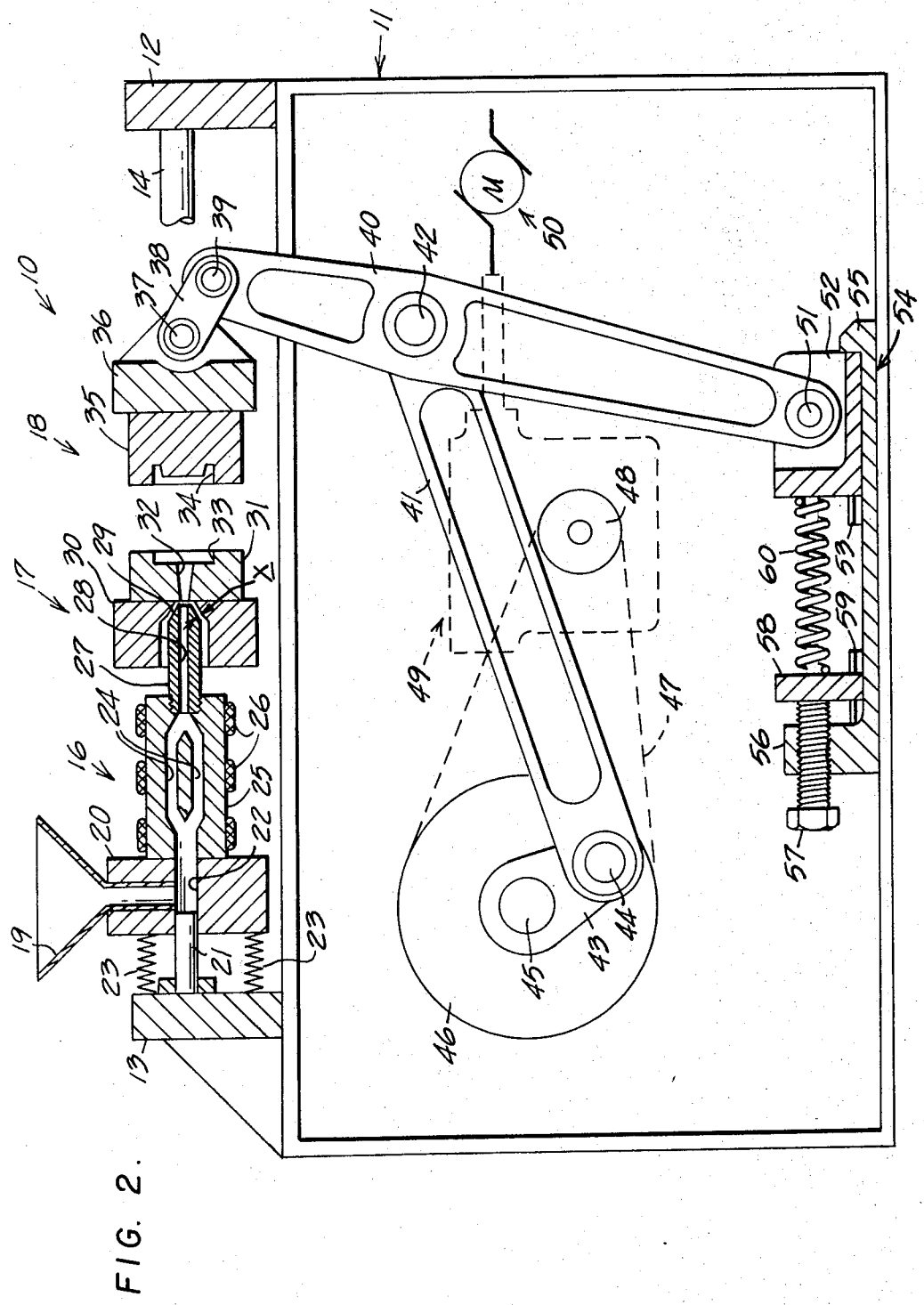
FIG. 2 is a partially sectioned side elevational view thereof.

Referring to FIGS. 1 and 2, an injection molding machine 10 comprises a stationary support 11 having upstanding, parallel brackets 12 and 13 secured thereon. A pair of horizontally disposed and parallel guide bars 14 and 15 are secured between the brackets to reciprocally mount a combined filling, heating and injection unit 16, a first mold unit 17 and a second mold unit 18 thereon. Pairs of longitudinally spaced stop means, such as collars 14a, 14b, 15a and 15b, are suitably secured to bars 14 and 15.

Unit 16 comprises a hopper 19 attached to a support bracket 20, reciprocally mounted on rods 14 and 15. A cylindrical injection plunger means 21 is secured to support 13 and has its free end disposed in a closely fitted cylindrical passage 22, formed in the support bracket. Four compression springs 23 comprise spring means disposed between the support bracket and support 13 to normally bias unit 16 to the position illustrated in FIG. 2, wherein the support bracket abuts stops 14b and 15b.

A standard comminuted plastic material, poured into hopper 19, flows into passage 22 for subsequent ejection by plunger 21 into branch passages 24, formed in a cylindrical metallic core member 25. Heating elements 26 are wrapped circumferentially around the core member and are suitably connected to an electrical power source (not shown) to selectively heat the core member to a sufficiently high level to liquify the comminuted plastic material ejected through the branch passages during a molding cycle. A tubular injection nozzle 27 is threadably mounted at its first end to core member 25 and has a centrally disposed passage 28 formed therethrough to communicate with the branch passages.

The opposite, second end of the nozzle terminates at a conically shaped nozzle head 29. The nozzle head is normally spaced at a distance X from a conforming, conically shaped recess formed in a support bracket 30. Such support bracket is reciprocally mounted on guide bars 14 and 15 and normally abuts stop collars 14a and 15a.

A first mold part 31 is secured to the forward face of support bracket 30 and has a diverging nozzle 32 formed centrally therein. The venturi type nozzle communicates with passage 28 and terminates at a female die cavity 33 adapted to mask an opposed male die cavity 34. The female and male die cavities are thus adapted to define a split mold cavity adapted to have an article formed therein.

The male die cavity is formed on the front face of a second mold part 35, secured to a support bracket 36 reciprocally mounted on bars 14 and 15. The rearward end of the support bracket is pivotally mounted by a pin 37 to a link 38. The link is pivotally mounted by a pin 39 to the upper end of a lever 40. The first end of a link 41 is pivotally mounted to a mid-portion of lever 40 by a pin 42 and is pivotally mounted at its second, opposite end to a crank 43 by a pin 44.

The crank is secured to a shaft 45 of a pulley 46, adapted to be driven by an endless belt 47. The belt is further entrained about a pulley 48 forming the output of a selectively actuated transmission 49, driven by an electrical motor 50. The above drive mechanisms constitute actuating means connected to second mold part 35 for selectively engaging and moving first mold part 31 axially leftwardly in FIG. 2.

The lower end of lever 40 is pivotally mounted by a pin 51 to a block 52, slidably mounted between parallel guide rails 53 (one shown in FIG. 2) secured on a stationary support plate 54. The support plate has an upstanding flange 55 formed on one end thereof to limit the rightward travel of the slide block. An upstanding second flange 56 is formed on the opposite, second end of the support plate and has a bolt 57 threadably mounted therein.

The free end of the bolt engages a plate 58 slidably mounted between parallel guide rails 59 (one shown in FIG. 2). A coil spring 60 is mounted between block 52 and plate 58 to normally bias the block rightwardly against flange 55. Such spring comprises spring means operatively connected to the above-described actuating means for applying a substantially uniform molding pressure to mold parts 31 and 35, as will be hereinafter more fully explained. It should be understood that other suitable spring means, such as a suitably calibrated accumulator or the like, could be utilized in lieu of spring coil 60.

In operation, hopper 19 is precharged with a suitable comminuted plastic material which flows into passages 22 and 24. The machine may be operated upon start-up to make certain that communicating passage means 22, 24 and 28 are fully charged with the plastic material. As described below, the volume of material displaced by the linear stroke of plunger 21 in passage 22 will substantially equal the amount of plastic material communicated to split mold cavity 33, 34 during each moulding cycle.

Figure 3:
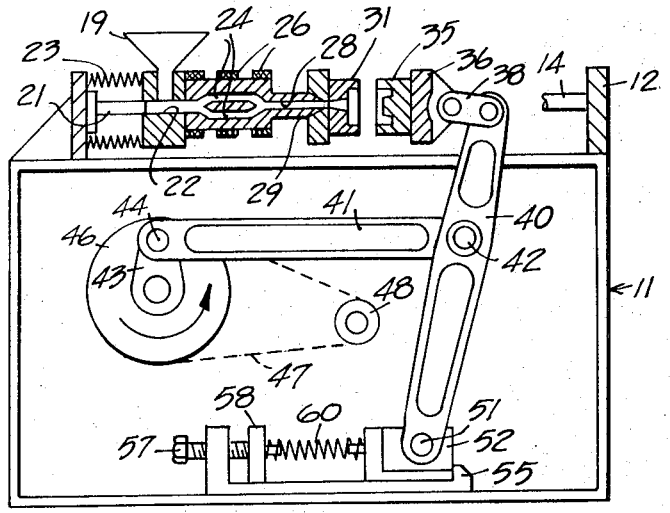
FIGS. 3-5 are reduced views, similar to FIG. 2, showing the machine in sequential stages of an injection molding operation.
Figure 4:
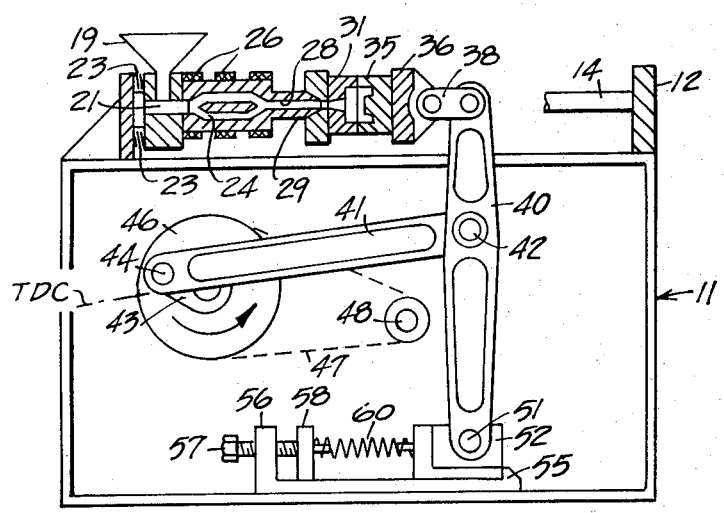
Figure 5:
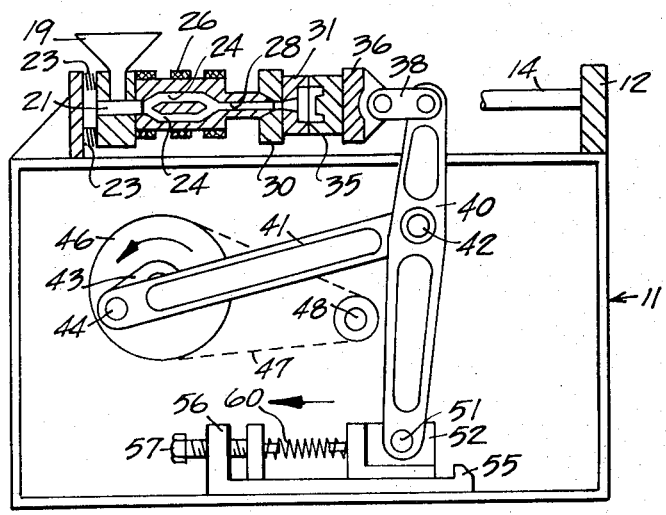

Motor 50 is selectively coupled to pulley 46 through gear box 49 to rotate output shaft 45 one revolution for each complete molding cycle of machine operation. A typical cycle may be achieved in six seconds to thus continuously rotate crank 43 at 10 r.p.m. FIGS. 3–5 illustrate three successive stages of the molding cycle.

FIG. 3 illustrates crank 43 in a substantially vertical position to initiate counterclockwise movement of lever 40 about pivot pin 51. Continued rotation of the crank towards its FIG. 4 position functions to move second mold part 35 into masked, abutting relationship with first mold part 31. Split mold cavity 33, 34 is thus completely closed.

Upon full compression of spring means 23, relatively stationary injection plunger 21 will have advanced rightwardly in passage 22 to inject a predetermined volume of plastic material into the split mold cavity, as dictated by the stroke of the plunger. Such stroke may be selectively adjusted by means, not shown, by adjusting the axial position of the free end of plunger 21 in passage 22. Heating coils 26 are suitably calibrated to assure complete liquification of the plastic material prior to its ingress into passage 28 and through nozzle 29.

When the pressure of the injected material exceeds a predetermined level, to insure complete filling of the split mold cavity, spring means 60 applies a controlled, substantially uniform force to the lower end of lever 40 at pivot pin 51 (FIG. 5). In turn, such force functions to apply a substantially uniform pressure on block 36 and mold parts 31 and 35 while crank 43 moves past its top deadcenter position (TDC). Upon continued counterclockwise rotation of the crank towards its FIG. 2 position, the mold parts disengage and springs 23 function to move support brackets 20 and 30 rightwardly until they engage stops 14b–15b and 14a–15a, respectively (FIG. 1).

The momentum of support bracket 30 will carry it rightwardly to separate nozzle 29 from the conforming, conically shaped recess formed in bracket 30, as illustrated by the separation distance X (e.g., 1/16th in.) in FIG. 2. Continued counterclockwise rotation of the crank past its FIG. 2 position, wherein bracket is moved to its rightwardmost position, will function to completely open the mold whereby the molded article can be readily removed. If so desired, mold parts 31 and 33 can be selectively cooled in a conventional manner to expedite the solidification of the liquified, molded material contained therein.

What is claimed is:

1. An injection molding machine comprising a stationary support, and
   filling, heating and molding units sequentially mounted on said support,
   said molding units respectively comprising first and second separable mold parts, defining a split mold cavity therein between, each mounted for reciprocal movement on said support,
   actuating means connected to said second mold part for engaging and moving said first mold part axially, and
   spring means operatively connected to said actuating means for applying a substantially uniform pressure to said second mold part when it engages and moves said first mold part,
   said actuating means comprising a lever having its upper end pivotally mounted to said second mold part and its lower end pivotally mounted to a slide block abutting said spring means.

2. The invention of claim 1 further comprising a second spring means positioned between said support and said filling unit to urge said filling unit towards said molding units.

3. The invention of claim 1 wherein said filling station comprises a hopper for charging said filling station with a plastic material and passage means for communicating said plastic material from said hopper to said mold cavity and further comprising plunger means for ejecting said plastic material through said passage means and into said mold cavity upon axial movement of said first and second mold parts theretowards.

4. The invention of claim 3 wherein said plunger means is secured to said support and normally projects into said passage means to communicate said hopper with said passage means and to prevent such communication when said ejector means is operative to eject said plastic material into said mold cavity.

5. The invention of claim 3 wherein said passage means terminates at said mold cavity at an ejector nozzle mounted on said support to be normally separated from said first mold part.

6. The invention of claim 3 wherein said heating unit comprises electrical heating coils circumferentially mounted about a portion of said passage means, adjacent to said filling unit, for heating said plastic material to a liquid state prior to its injection into said mold cavity.

7. The invention of claim 1 wherein said support comprises a pair of longitudinally extending and parallel guide bars slidably mounting said filling, heating and molding units thereon.

8. The invention of claim 7 further comprising stop means mounted on said guide bars for limiting the axial movement of said filling and heating units towards said molding units and for limiting the axial movement of said first mold part towards said second mold part.

9. The invention of claim 1 further comprising adjustment means for selectively compressing said spring against said slide block to adjust the pressure applied to said first mold part by said second mold part.

10. The invention of claim 1 wherein said actuating means further comprises a motor-driven crank operatively connected to said lever, between the ends thereof.

11. The invention of claim 10 wherein said actuating means further comprises a link pivotally attached between said lever and said bellcrank.

12. In an injection molding machine comprising separable first and second mold parts, defining a split mold cavity therebetween, and actuating means, including a lever, operatively connected to said second mold part for axially engaging and moving said first mold part with said second mold part, the invention comprising spring means operatively connected to the lever of said actuating means for applying a substantially uniform pressure to said second mold part when it axially engages and moves said first mold part.

13. The invention of claim 12 further comprising second spring means positioned to urge said first mold part towards said second mold part.

14. The invention of claim 12 further comprising plunger means for ejecting a plastic material into said mold cavity upon axial movement of said first and second mold parts towards said plunger means.

15. The invention of claim 14 further comprising heating means positioned adjacent to said plunger means for heating said plastic material to a liquid state prior to its injection into said mold cavity.

16. The invention of claim 12 further comprising stop means for limiting the axial movement of said first mold part towards said second mold part.

17. The invention of claim 12 wherein the lever of said actuating means has its upper end pivotally mounted to said second mold part and its lower end pivotally mounted to a slide block abutting said spring means.

18. The invention of claim 17 further comprising adjustment means for selectively compressing said spring against said slide block to adjust the pressure applied to said first mold part by said second mold part.

19. The invention of claim 17 wherein said actuating means further comprises a motor-driven crank operatively connected to said lever, between the ends thereof.

20. The invention of claim 19 wherein said actuating means further comprises a link pivotally attached between said lever and said crank.

* * * * *